United States Patent
Zug

(10) Patent No.: US 12,078,397 B2
(45) Date of Patent: Sep. 3, 2024

(54) SURGE CONTROL SUBCOOLING CIRCUIT

(71) Applicant: Honeywell International Inc., Charlotte, NC (US)

(72) Inventor: Andrew Zug, Costa Mesa, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/453,094

(22) Filed: Nov. 1, 2021

(65) Prior Publication Data

US 2022/0178602 A1    Jun. 9, 2022

Related U.S. Application Data

(60) Provisional application No. 63/121,670, filed on Dec. 4, 2020.

(51) Int. Cl.
*F25B 49/02* (2006.01)
*F25B 5/02* (2006.01)

(52) U.S. Cl.
CPC ............... *F25B 49/02* (2013.01); *F25B 5/02* (2013.01)

(58) Field of Classification Search
CPC .................................. F25B 49/02; F25B 5/02
See application file for complete search history.

(56) References Cited

U.S. PATENT DOCUMENTS

| | | |
|---|---|---|
| 4,771,610 A | 9/1988 | Nakashima et al. |
| 4,918,942 A | 4/1990 | Jaster |
| 5,157,943 A | 10/1992 | Jaster et al. |
| 6,901,763 B2 | 6/2005 | Memory et al. |
| 7,111,472 B1 | 9/2006 | Cloud |
| 7,185,506 B2 | 3/2007 | Aflekt et al. |
| 7,370,493 B2 | 5/2008 | Suzuki et al. |
| 2003/0024266 A1 | 2/2003 | Zhang et al. |

(Continued)

FOREIGN PATENT DOCUMENTS

| | | |
|---|---|---|
| EP | 1260776 A1 | 11/2002 |
| EP | 1519127 A1 | 3/2005 |

(Continued)

OTHER PUBLICATIONS

Jansen, Method and apparatus for isothermal cooling, 2018, Full Document (Year: 2018).*

(Continued)

*Primary Examiner* — Nael N Babaa
(74) *Attorney, Agent, or Firm* — Shumaker & Sieffert, P.A.

(57) ABSTRACT

The disclosure describes a system that includes an evaporator, an accumulator downstream of the evaporator, a centrifugal compressor downstream of the accumulator, a first heat exchanger stage downstream of the centrifugal compressor, and a second heat exchanger stage downstream of the first heat exchanger stage. The evaporator is configured to cool a conditioned air stream using a refrigerant. The accumulator is configured to store excess refrigerant. The centrifugal compressor is configured to compress the refrigerant. The first heat exchanger stage is configured to cool the refrigerant using environmental air. The second heat exchanger stage is configured to cool the refrigerant from the first heat exchanger stage using a portion of the excess refrigerant from the accumulator.

20 Claims, 6 Drawing Sheets

(56) References Cited

U.S. PATENT DOCUMENTS

| | | | |
|---|---|---|---|
| 2010/0005831 A1* | 1/2010 | Vaisman | F25B 13/00 |
| | | | 62/470 |
| 2012/0079846 A1 | 4/2012 | Jin | |
| 2012/0174605 A1 | 7/2012 | Huff et al. | |
| 2013/0068430 A1 | 3/2013 | Piesker | |
| 2017/0268811 A1* | 9/2017 | Ochiai | F25B 13/00 |

FOREIGN PATENT DOCUMENTS

| | | | | |
|---|---|---|---|---|
| EP | 3620378 A1 * | 3/2020 | | B60H 1/00042 |
| WO | 2008094157 A1 | 8/2008 | | |
| WO | 2009029068 A1 | 3/2009 | | |
| WO | 2012168544 A1 | 12/2012 | | |
| WO | WO-2018204184 A1 * | 11/2018 | | F25B 40/00 |

OTHER PUBLICATIONS

Zug, Air-driven vapor cycle refrigeration system, 2019, Full Document (Year: 2019).*

Extended Search Report from counterpart European Application No. 21210323.8 dated May 2, 2022, 9 pp.

Response to Extended Search Report dated May 2, 2022, from counterpart European Application No. 21210323.8, filed May 31, 2022, 17 pp.

Communication pursuant to Article 94(3) EPC from counterpart European Application No. 21210323.8 dated Dec. 18, 2023, 11 pp.

Response to Communication pursuant to Article 94(3) EPC dated Dec. 18, 2023, from counterpart European Application No. 21210323.8 filed Apr. 15, 2024, 15 pp.

* cited by examiner

SURGE CONTROL SUBCOOLING CIRCUIT

This application claims the benefit of U.S. Provisional application No. 63/121,670, entitled "SURGE CONTROL SUBCOOLING CIRCUIT" and filed on Dec. 4, 2020, which is incorporated herein by reference in its entirety.

TECHNICAL FIELD

The present disclosure relates to systems and techniques for surge control of vapor cycle systems.

BACKGROUND

A vapor cycle system may include a centrifugal compressor configured to pressurize a refrigerant. Variations in operating conditions of the vapor cycle system, such as varying heat loads of an evaporator or flow rates of the refrigerant through the evaporator, may create pulsations of pressure and flow (i.e., surge) at the centrifugal compressor. Under surge conditions, the centrifugal compressor may run erratically and, in instances of flow reversal, receive mechanical damage. As one example, at a low flow condition, such as start-up, the flow rate of the refrigerant may be too low for the centrifugal compressor to generate a design discharge pressure at a compressor outlet. As a result, the compressor outlet pressure may exceed an impeller outlet pressure, and the refrigerant may flow back into the centrifugal compressor and subsequently reverse when the compressor outlet pressure falls below the impeller outlet pressure. To better control flow and/or pressure and reduce surge conditions, the vapor cycle system may include a surge control valve to recirculate a portion of the refrigerant from the compressor outlet to a compressor inlet. As a result, the compressor may continue to receive sufficient flow to maintain the design discharge pressure.

SUMMARY

Systems and techniques described herein may control surge of refrigerant in a vapor cycle system by maintaining flow of the refrigerant through an evaporator and a centrifugal compressor and diverting a liquid fraction of the refrigerant from the evaporator through a subcooling circuit that both evaporates the liquid refrigerant prior to discharge into the centrifugal compressor and provides a second stage of cooling to the pressurized refrigerant after passage through a condenser. In a main refrigerant circuit of the vapor cycle system, an accumulator downstream of an evaporator separates and stores an excess liquid fraction of the refrigerant and discharges a vapor fraction of the refrigerant to a centrifugal compressor. The centrifugal compressor compresses and pumps the vapor refrigerant through the condenser and a subcooler to cool and condense the vapor refrigerant prior to expanding and entering the evaporator. At low heat loads, the evaporator continues to receive all the refrigerant pumped by the centrifugal compressor and discharges a subcooled stream of refrigerant, as the evaporator does not receive sufficient heat to superheat the refrigerant. The accumulator diverts a portion of the separated excess liquid fraction of the refrigerant to the subcooler. The excess liquid refrigerant is heated using the relatively warm pressurized refrigerant from the centrifugal compressor via the condenser and returned to the centrifugal compressor as vapor refrigerant, such that the centrifugal compressor receives superheated refrigerant. At the same time, the relatively cool liquid fraction of refrigerant from the accumulator cools the relatively warm refrigerant from the condenser. In this way, vapor cycle systems described herein may maintain a relatively high flow rate of superheated vapor refrigerant through the centrifugal compressor at a wide range of heat loads without bypassing refrigerant around the centrifugal compressor using a surge control valve.

In some instances, vapor cycle systems that include passive surge control mechanisms described herein may be less expensive and more robust than active surge control mechanisms, such as a surge control valve or other active compressor bypass mechanism. For example, the surge control valve may be a substantial point of failure in a vapor cycle system, as the surge control valve may leak or fail open (e.g., to ensure continuity of operation), in both instances bypassing the centrifugal compressor and substantially reducing cooling capacity. In contrast, valve-less surge control of vapor cycle systems may have reduced complexity and increased continuity compared to vapor cycle systems that include a surge control valve or other active surge control device or mechanism.

In some instances, vapor cycle systems described herein may further increase an efficiency of the centrifugal compressor. For example, the second stage of cooling provided by the subcooler may permit the condenser to operate at a relatively low condensing temperature, such that the centrifugal compressor may operate at a lower compressor pressure ratio and at lower flow rates before surge conditions are met.

In some examples, the disclosure describes a system that includes an evaporator, an accumulator downstream of the evaporator, a centrifugal compressor downstream of the accumulator, a first heat exchanger stage downstream of the centrifugal compressor, and a second heat exchanger stage downstream of the first heat exchanger stage. The evaporator is configured to cool a conditioned air stream using a refrigerant. The accumulator is configured to store excess refrigerant. The centrifugal compressor is configured to compress the refrigerant. The first heat exchanger stage is configured to cool the refrigerant using environmental air. The second heat exchanger stage is configured to cool the refrigerant from the first heat exchanger stage using a portion of the excess refrigerant from the accumulator.

In some examples, the disclosure describes a subcooling system for controlling surge in a vapor cycle system. The subcooling system includes an accumulator and a subcooler. The accumulator is configured to receive a refrigerant from an evaporator. The refrigerant includes a vapor fraction of the refrigerant and a liquid fraction of the refrigerant. The accumulator is configured to separate the liquid fraction of the refrigerant from the vapor fraction of the refrigerant and discharge the vapor fraction of the refrigerant to a centrifugal compressor. The subcooler is configured to receive the liquid fraction of the refrigerant from the accumulator, evaporate at least a portion of the liquid fraction of the refrigerant by cooling refrigerant from a condenser, and discharge the evaporated refrigerant to the centrifugal compressor.

In some examples, the disclosure describes a method for cooling a pressurized air stream. The method includes cooling, by a main circuit of a vapor cycle system, the pressurized air stream using a refrigerant. The main circuit of the vapor cycle system includes an evaporator, a centrifugal compressor, a condenser, and an expansion device. The method includes diverting, by a subcooling circuit of the vapor cycle system, a liquid fraction of the refrigerant from the evaporator through a subcooler downstream of the condenser to evaporate the liquid fraction of the refrigerant.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

A conventional vapor cycle system may be configured to operate at various heat loads through inclusion of a surge control valve. When a heat load of the vapor cycle system is low, the vapor cycle system may reduce a mass flow rate of refrigerant through the evaporator to maintain a temperature of the vapor refrigerant at the inlet of the centrifugal compressor at superheat. To avoid surge at this reduced flow rate, the vapor cycle system may maintain a mass flow rate of vapor refrigerant at an inlet of a centrifugal compressor above a surge limit by opening the surge control valve to recirculate vapor refrigerant from an outlet of the centrifugal compressor to the inlet of the centrifugal compressor. To provide this active surge control, the vapor cycle system may include various expensive, complex, and heavy components, such as a controller, a controller-modulated surge control valve, and surge detection components. If the surge control valve fails open or leaks, the resulting increase in flow of recirculated vapor refrigerant to the inlet of the compressor may substantially reduce a cooling capacity of the vapor cycle system.

Vapor cycle systems described herein may be configured to operate at various heat loads without the use of a surge control valve and associated components. As will be described below, vapor cycle systems described herein may control surge of a centrifugal compressor in a passive manner (i.e., without the use of active control components), potentially allowing for a controller-less system, and may introduce no additional failure modes other than leakage, thereby improving system cost and reliability compared to a conventional vapor cycle system that includes a surge control valve or other active surge components.

Rather than maintain a lower flow rate of refrigerant through an accumulator to maintain superheat, and recirculate refrigerant to achieve a higher flow rate through the centrifugal compressor above a surge threshold, vapor cycle systems described herein may maintain a relatively high mass flow rate of refrigerant through both the evaporator and the centrifugal compressor. To evaporate any liquid fraction of the refrigerant received from the evaporator at low heat load conditions, vapor cycle systems described herein may divert a portion of the liquid fraction through a subcooler to evaporate the liquid fraction and maintain superheat at the centrifugal compressor. The heat used to evaporate the liquid fraction is removed from the refrigerant downstream of the condenser, thereby providing an additional stage of cooling and allowing the condenser to operate at a higher temperature, and therefore lower condensing pressure.

Figure 1:
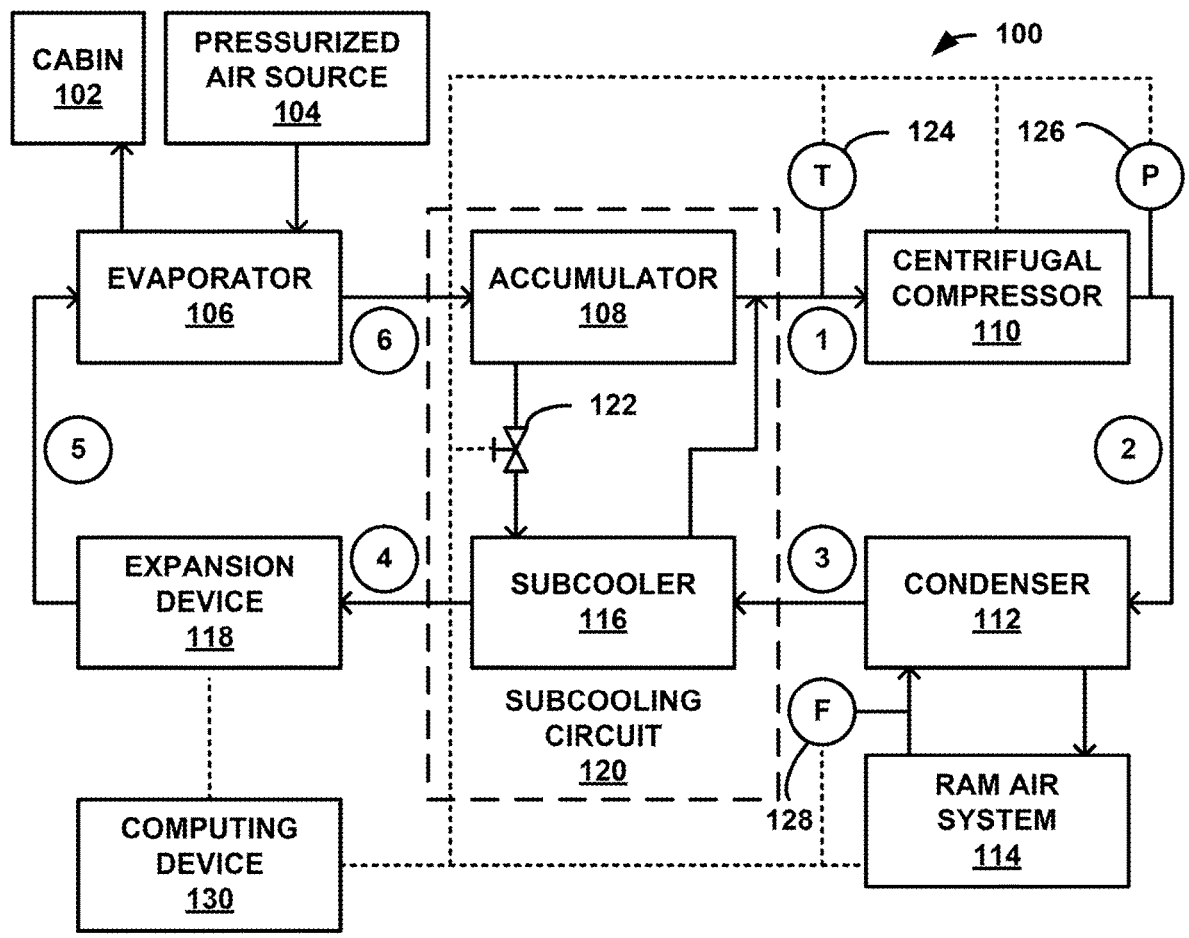
FIG. 1 is a schematic block diagram illustrating an example vapor cycle system that includes an accumulator and second cooling stage for controlling surge for a centrifugal compressor.

FIG. 1 is a schematic block diagram illustrating an example vapor cycle system 100 that includes a subcooling circuit 120 for controlling surge for a centrifugal compressor 110. Vapor cycle system 100 includes various states 1-6, as will be referenced in FIGS. 4A-4D below.

Vapor cycle system 100 may be configured to cool a pressurized air stream from a pressurized air source 104 to provide a clean cabin air stream to a cabin 102. Pressurized air source 104 may include any component or system configured to generate and discharge pressurized air, such as bleed air from an engine or compressed air from an auxiliary power unit or cabin air compressor. Cabin 102 may include a conditioned volume, such as a cabin of an aircraft, watercraft, or spacecraft. Cabin 102 and/or pressurized air source 104 may operate at a wide range of conditions, such that an evaporator 106 may exert a wide range of heat loads on vapor cycle system 100. For example, at grounded conditions, a pressure and temperature of environmental air used for the pressurized air stream may be relatively pressurized and warm compared to environmental air available at flight conditions.

Vapor cycle system 100 includes evaporator 106 configured to cool the pressurized air stream using a refrigerant. On a hot side, evaporator 106 may be configured to receive the pressurized air stream, remove heat from the pressurized air stream using the refrigerant, and discharge a cabin air stream. On the cold side, evaporator 106 may be configured to receive the refrigerant from an expansion device 118, heat the refrigerant using heat from the pressurized air stream, and discharge the heated refrigerant. A variety of refrigerants may be used including, but not limited to, r1234yf, r1233zd, and the like. Expansion device 118 may include a variety of expansion devices including, but not limited to, an expansion valve, an electronic expansion valve, and the like.

Evaporator 106 may be configured to receive substantially all of a refrigerant pumped from centrifugal compressor 110, such that a quality of refrigerant discharged from evaporator 106 may be dependent on a heat load of evaporator 106. For example, at relatively high heat loads, evaporator 106 may discharge refrigerant as superheated refrigerant to centrifugal compressor 110 via an accumulator 108. However, at relatively low heat loads, evaporator 106 may not evaporate all of the refrigerant, and may discharge a liquid fraction and a vapor fraction of refrigerant to accumulator 108.

To collect the liquid fraction of the refrigerant discharged from evaporator 106, vapor cycle system 100 includes accumulator 108 downstream of evaporator 106. Accumulator 108 may be configured to store excess liquid refrigerant, which may include any refrigerant that is not evaporated in evaporator 106. As described above, at low heat loads, evaporator 106 may only evaporate a portion of the liquid refrigerant and discharge a mixed stream of vapor and liquid refrigerant. In some examples, accumulator 108 may be configured to separate liquid refrigerant from the refrigerant received from evaporator 106, such as through gravity, and store the separated liquid refrigerant as the excess refrigerant. For example, liquid refrigerant may become entrained in the vapor refrigerant, potentially causing mechanical damage to centrifugal compressor 110. The liquid separator may remove this liquid refrigerant prior to entering centrifugal compressor 110 to reduce impingement of the liquid refrigerant on impellers of centrifugal compressor 110. In some examples, accumulator 108 may include a liquid separator configured to separate the liquid refrigerant.

Vapor cycle system 100 includes centrifugal compressor 110 downstream of accumulator 108. Centrifugal compressor 110 is configured to compress the refrigerant from an inlet pressure to a higher outlet pressure and pump the refrigerant through the main circuit of vapor cycle system 100. Centrifugal compressor 110 may be configured to receive superheated refrigerant, such that centrifugal compressor 110 may not be damaged by entrained liquid droplets and/or may operate efficiently to compress vapor refrigerant. Centrifugal compressor 110 may be configured to operate efficiently at or above a minimum flow rate of refrigerant, below which centrifugal compressor 110 may experience surge conditions.

The compressed vapor refrigerant may be relatively hot due to the increased enthalpy of the refrigerant after compression. To cool the relatively hot vapor refrigerant from centrifugal compressor 110, vapor cycle system 100 includes at least a first heat exchanger stage and a second heat exchanger stage downstream of centrifugal compressor 110 and upstream of expansion device 118. While described as performing separate functions, in some examples, the first and second heat exchanger stages are integrated into a same unit. The first and second heat exchanger stages may be configured to receive superheated vapor refrigerant and cool and condense the superheated vapor refrigerant to saturated liquid refrigerant. At least one of the first or second heat exchanger stages is configured to cool the refrigerant using environmental air, while at least the other of the first or second heat exchanger stages is configured to cool the refrigerant using a portion of the excess refrigerant from accumulator 108, as will be described further below.

In the example of FIG. 1, vapor cycle system 100 includes a condenser 112 downstream of centrifugal compressor 110 as a first heat exchanger stage and a subcooler 116 downstream of condenser 112 as a second heat exchanger stage. However, in other examples, other heat exchangers may be used for the first and second heat exchanger stages and/or arranged in different orders. For example, a first heat exchanger stage may be configured to receive excess refrigerant from accumulator 108, while a second heat exchanger stage may be configured to receive environmental air.

In the example of FIG. 1, condenser 112 is configured to receive pressurized vapor refrigerant from centrifugal compressor 110 and remove heat from the pressurized vapor refrigerant using environmental air as a heat sink. In the example of FIG. 1, condenser 112 is cooled by a ram air system 114; however, in other examples, other environmental air sources may be used. Heat removal from the pressurized vapor refrigerant may correspond to a temperature differential between the vapor refrigerant and the environmental air such that, as a temperature of the pressurized vapor refrigerant increases relative to the environmental air, an amount of heat transferred from the vapor refrigerant increases.

Ram air system 114 may be configured to supply environmental air to condenser 112. For example, ram air system 114 may include a ram air inlet configured to receive environmental air from outside the aircraft and a ram air outlet configured to discharge environmental air from the aircraft. Ram air system 114 may be configured to control a flow rate of air using the ram air inlet at flight conditions and one or more ram air fans at grounded conditions.

Subcooler 116 is configured to provide recuperative heating of excess refrigerant upstream of centrifugal compressor 110 and cooling of refrigerant downstream of centrifugal compressor 110. On a hot side, subcooler 116 is configured to receive refrigerant from condenser 112, cool the refrigerant from condenser 112 using refrigerant from accumulator 108, and discharge liquid refrigerant to expansion device 118. On a cold side, subcooler 116 is configured to receive refrigerant from accumulator 108, heat the refrigerant using refrigerant from condenser 112, and discharge the heated, vapor refrigerant to centrifugal compressor 110. At high heat loads in which evaporator 106 evaporates substantially all the refrigerant and discharges superheated vapor refrigerant, subcooler 116 may not receive refrigerant from accumulator 108, or may only receive vapor refrigerant with a relatively low cooling capacity. However, at low heat loads in which evaporator 106 evaporates only a portion of the refrigerant and discharges both liquid and vapor refrigerant to accumulator 108, a portion of the liquid refrigerant may be fed to subcooler 116.

In some examples, a portion of the excess liquid refrigerant from accumulator 108 may be gravity-fed to subcooler 116. For example, accumulator 108 may include a port at a bottom of accumulator 108 to allow excess liquid refrigerant to flow via gravity to subcooler 116. In some examples, vapor cycle system 100 may include a valve 122 configured to regulate and/or isolate flow of the excess liquid refrigerant to subcooler 116 from accumulator 108. In some examples, rather than regulate flow with valve 122, a differential pressure between accumulator 108 and centrifugal compressor 110 may be sufficiently low that flow of refrigerant between accumulator 108 and subcooler 116 may be driven by gravity and related to a quality of the refrigerant in accumulator 108. For example, if no liquid refrigerant is present in accumulator 108, the differential pressure between accumulator 108 and centrifugal compressor 110 may be so low that refrigerant does not flow between accumulator 108 and subcooler 110, or may only flow at low flow rates. However, if liquid refrigerant is present in accumulator 108, a head of the liquid refrigerant may be sufficient to drive flow of the liquid refrigerant through gravity from accumulator 108 to subcooler 116.

Vapor cycle system 100 may include various measurement and control components. In the example of FIG. 1, vapor cycle system 100 includes a temperature sensor 124, a pressure sensor 126, a flow sensor 128, and a computing device 130; however, in other examples, vapor cycle system 100 may include other instrumentation including, but not limited to, temperature sensors, pressure sensors, flow sensors, and the like.

Temperature sensor 124 may be configured to detect a temperature of vapor refrigerant entering centrifugal compressor 110. For example, the temperature of the vapor refrigerant may indicate a degree of superheat and/or a quality of the refrigerant entering centrifugal compressor 110. Pressure sensor 126 may be configured to detect a discharge pressure of centrifugal compressor 110. For example, the discharge pressure of centrifugal compressor 110 may correspond to a desired flow rate of refrigerant through vapor cycle system 110. Additionally or alternatively, centrifugal compressor 110 may include a speed sensor configured to detect an impeller speed of centrifugal compressor 110. Flow sensor 128 may be configured to detect a flow rate of environmental air from ram air system 114. For example, the flow rate of environmental air may correspond to a desired amount of cooling from condenser 112. Additionally or alternatively, one or more ram air fans of ram air system 114 may include a speed sensor configured to detect a fan speed of the one or more ram air fans.

Computing device 130 may be configured to receive measurement signals from measurement components, such as temperature sensor 124, pressure sensor 126, and flow sensor 128, and send control signals to control components, such as centrifugal compressor 110, ram air system 114, expansion device 118, and valve 122. Computing device 130 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

Computing device 130 may be configured to control surge in vapor cycle system 100. For example, computing device 130 may be configured to receive a temperature of a cabin air stream and determine an offset of the temperature of the cabin air stream from a setpoint. Computing device 130 may be configured to send a control signal to centrifugal compressor 110 to control a discharge pressure as measured by pressure sensor 126, to increase or decrease to achieve a desired amount of cooling at evaporator 106 and/or send a control signal to ram air system 114 to control a flow rate, as measured by flow sensor 128, to increase or decrease to achieve a desired amount of cooling at condenser 112. Computing device 130 may be configured to send a control signal to expansion device 118 to control a pressure of refrigerant to increase or decrease (and therefore, an evaporating temperature of the refrigerant to correspondingly decrease or increase) to maintain a superheat, as measured by temperature sensor 124, at centrifugal compressor 110. A differential pressure between accumulator 108 and centrifugal compressor 110 may drive flow of refrigerant from accumulator 108 to subcooler 110. In examples in which vapor cycle system 100 includes valve 122, computing device 110 may be configured to send a control signal to valve 122 to control a flow rate of refrigerant to increase or decrease to achieve a desired amount of cooling of refrigerant from condenser 112 at subcooler 116 and/or heating of refrigerant from accumulator 108 at subcooler 116. In some examples, computing device 130 may control surge in vapor cycle system 100 by controlling expansion device 118. For example, computing device 130 may send a control signal to expansion device 118 to control pressure and/or flow rate of refrigerant through evaporator 106.

In some examples, such as shown in FIG. 1, vapor cycle system 100 may not include an active surge control system configured to recirculate refrigerant from an outlet of centrifugal compressor 110 to an inlet of centrifugal compressor 110. As such, accumulator 108 and subcooler 116 are configured to operate as subcooling circuit 120 to control surge in vapor cycle system 100 and/or lower a condensing pressure of vapor cycle system 100. A main circuit of vapor cycle system 100, which includes evaporator 106, centrifugal compressor 110, condenser 112, and expansion device 118, may be configured to cool the pressurized air stream from pressurized air source 104 for use in cabin 102. For example, evaporator 106 may be configured to discharge refrigerant, centrifugal compressor 110 may be configured to compress the refrigerant, condenser 112 may be configured to cool the refrigerant, and expansion device 118 may be configured to reduce a pressure of the refrigerant.

Subcooling circuit 120 may be configured to divert a liquid fraction of the refrigerant from evaporator 106 through subcooler 116 downstream of condenser 112 to evaporate the liquid fraction of the refrigerant. For example, accumulator 108 may be configured to receive the refrigerant from evaporator 106. At low heat loads, the refrigerant includes both a vapor fraction of the refrigerant and a liquid fraction of the refrigerant. Accumulator 108 may be configured to separate the liquid fraction of the refrigerant from the vapor fraction of the refrigerant. Accumulator 108 may be configured to discharge the vapor fraction of the refrigerant to centrifugal compressor 110 and discharge at least a portion of the liquid fraction of the refrigerant to subcooler 116. Subcooler 116 may be configured to evaporate at least a portion of the liquid fraction of the refrigerant from accumulator 108 by cooling refrigerant from condenser 112. Subcooler 116 may be configured to discharge the evaporated refrigerant to centrifugal compressor 110 and discharge the cooled refrigerant to expansion device 118.

Figure 2A:
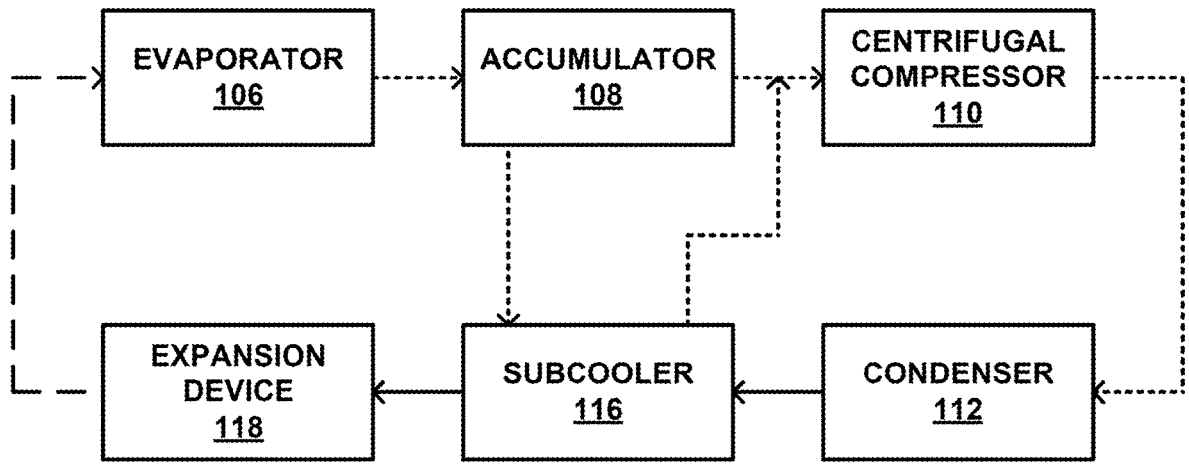
FIG. 2A is a schematic block diagram illustrating the example vapor cycle system of FIG. 1 at high heat load.

In some examples, vapor cycle system 100 is configured to maintain a substantially similar mass flow rate of the refrigerant through evaporator 106 and centrifugal compressor 110. As such, a quality of the refrigerant from evaporator 106 and condenser 112 may change depending on a heat load at evaporator 106. At high heat loads, subcooler 116 may be configured to substantially remain offline, such as through reduced flow, stopped flow, or flow of low heat capacity vapor refrigerant. FIG. 2A is a schematic block diagram illustrating the example vapor cycle system 100 of FIG. 1 at high heat load. At high heat load, heat from the pressurized air stream is sufficient to cause evaporator 106 evaporate substantially all the refrigerant, such that the quality of the refrigerant discharged from evaporator 106 is about 1. This vapor refrigerant is received by accumulator 108 and discharged to centrifugal compressor 110. In some examples, a shut-off valve or other isolation device may isolate subcooler 116 from accumulator 108 when the refrigerant discharged from accumulator 108 is superheated. In some examples, a portion of the vapor refrigerant may be discharged to subcooler 116 to further heat the vapor refrigerant discharged to centrifugal compressor 110.

Figure 2B:
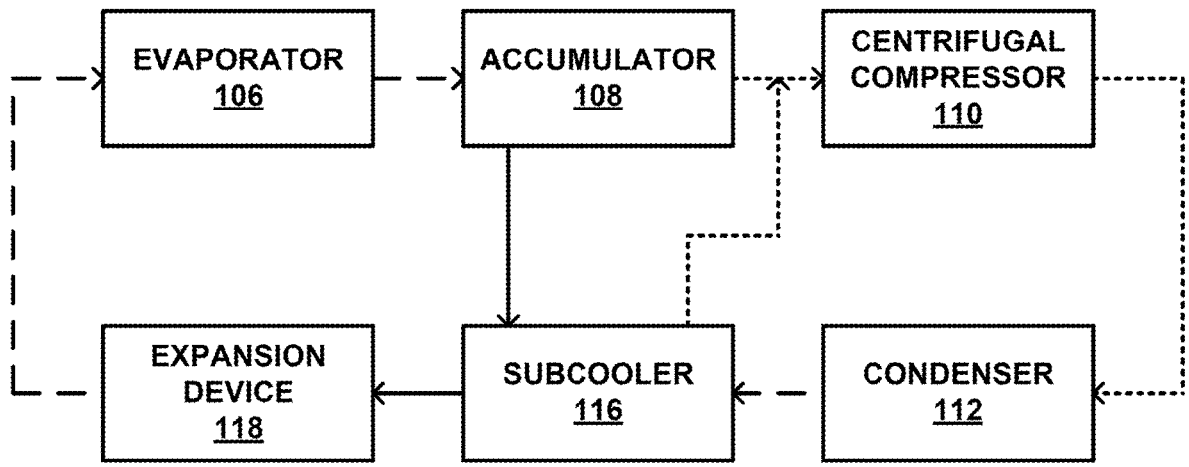
FIG. 2B is a schematic block diagram illustrating the example vapor cycle system of FIG. 1 at low heat load.

At low heat loads, subcooler 116 may be configured to cool the vapor refrigerant using a portion of the excess refrigerant from accumulator 108. FIG. 2B is a schematic block diagram illustrating the example vapor cycle system 100 of FIG. 1 at low heat load. As a heat load of evaporator 106 is reduced and a quality of the refrigerant at an outlet of evaporator 106 drops below 1.0, accumulator 108 may separate, such as via gravity, the liquid fraction of the refrigerant and use it to suppress an inlet temperature of expansion device 118. In this way, vapor cycle system 100 may replace an active surge control device with a passive device lacking the complexity and failure modes of the surge control valve. Subcooler 116 may lower a temperature of condenser 112, and correspondingly compressor pressure ratio and power, by having a low-temperature heat sink (subcooler 116) downstream of condenser 112.

In addition to controlling surge, vapor cycle system 100 may be configured to operate at a reduced condensing pressure, and therefore reduced system pressure, compared to a vapor cycle system that does not include subcooling circuit 120. For example, a temperature of refrigerant from accumulator 108 at subcooler 116 may be lower than a temperature of environmental air from ram air system 114. A greater amount of cooling may be achieved through both condenser 112 and subcooler 116 than a single condenser configured to cool and condense vapor refrigerant from centrifugal compressor 110 to liquid refrigerant. As noted above, heat transfer at condenser 112 may be driven by a temperature differential between a condensing temperature and an environmental air temperature such that, as a condensing temperature is reduced, an amount of cooling is reduced. By splitting the heat exchange into two heat exchanger stages (condenser 112 and subcooler 116), a condensing temperature, and therefore system pressure, may be reduced.

Figure 3:
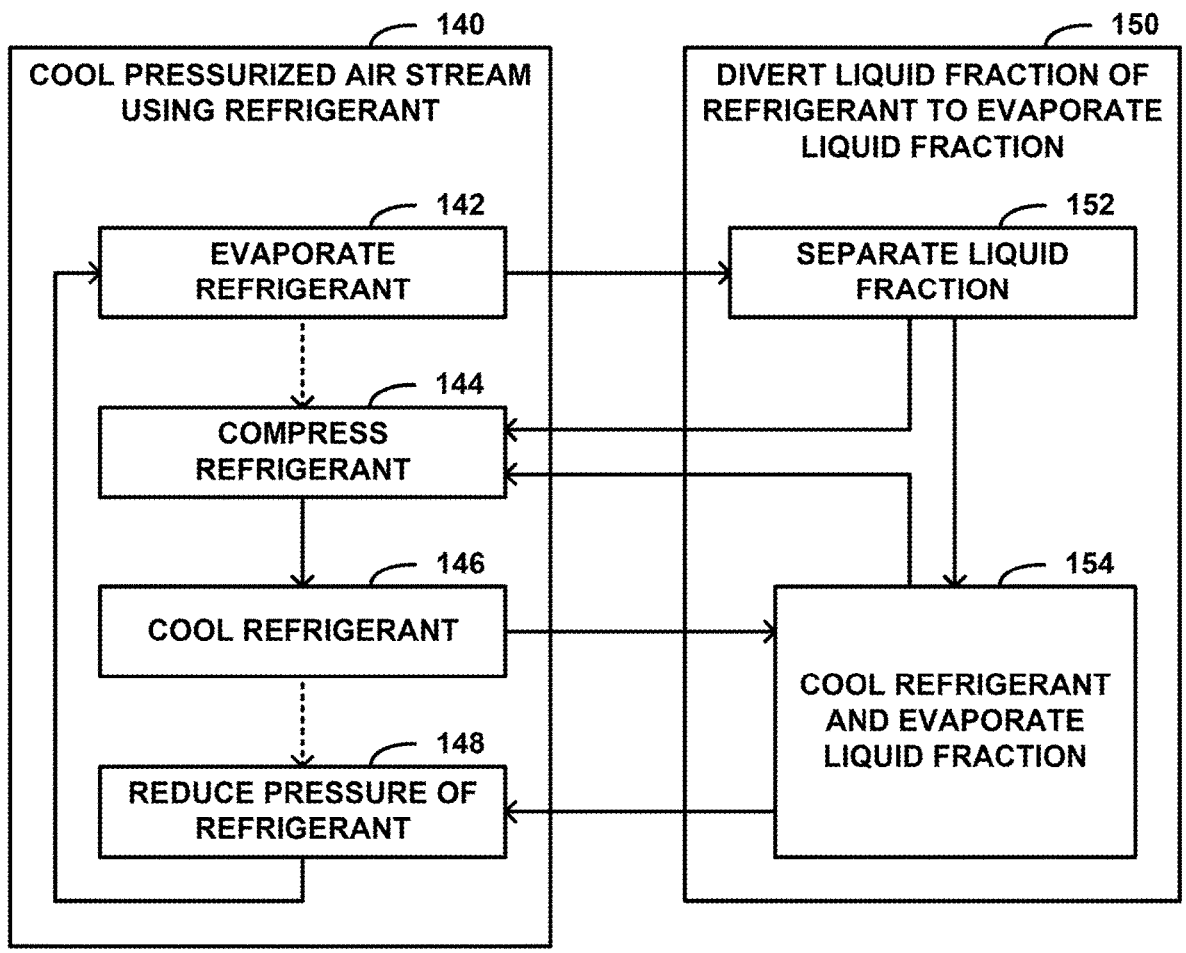
FIG. 3 is a flowchart of an example technique for controlling surge in a vapor cycle system.

FIG. 3 is a flowchart of an example technique for cooling a pressurized air stream while controlling surge in vapor cycle system 100. The method of FIG. 3 includes cooling, by a main circuit of vapor cycle system 100, the pressurized air stream using a refrigerant (140). In some examples, cooling the pressurized air stream includes evaporating, by evaporator 106, at least a portion of the refrigerant by removing heat from the pressurized air stream (142); compressing, by centrifugal compressor 110, the refrigerant from evaporator 106 via accumulator 108 (144); cooling, by condenser 112, the refrigerant using environmental air (146); and reducing, by expansion device 118, a pressure of the refrigerant (148). In some examples, a mass flow rate of refrigerant through evaporator 106 is substantially similar to a mass flow rate of refrigerant through centrifugal compressor 110.

The method of FIG. 3 includes diverting, by a subcooling circuit 120 of vapor cycle system 100, a liquid fraction of the refrigerant from the evaporator through a subcooler downstream of the condenser to evaporate the liquid fraction of the refrigerant. For example, subcooling circuit 120 includes accumulator 108 and subcooler 116. In some examples, the method of FIG. 3 includes receiving, by accumulator 108, the refrigerant from evaporator 106 that is cooling the pressurized air stream, separating, by evaporator 106, the liquid fraction of the refrigerant from a vapor fraction of the refrigerant from the evaporator (152), and discharging, by accumulator 108, a vapor fraction of the refrigerant from evaporator 106 to centrifugal compressor 110 and the liquid fraction of the refrigerant to subcooler 116. In some examples, the method of FIG. 3 includes providing, by condenser 112, a first stage of heat transfer to vapor refrigerant from centrifugal compressor 110 by cooling the refrigerant (146) and providing, by subcooler 116, a second stage of heat transfer to the refrigerant from condenser 112 by cooling the refrigerant from condenser 112 and evaporating a portion of the liquid fraction from accumulator 108 (154).

Figure 4A:
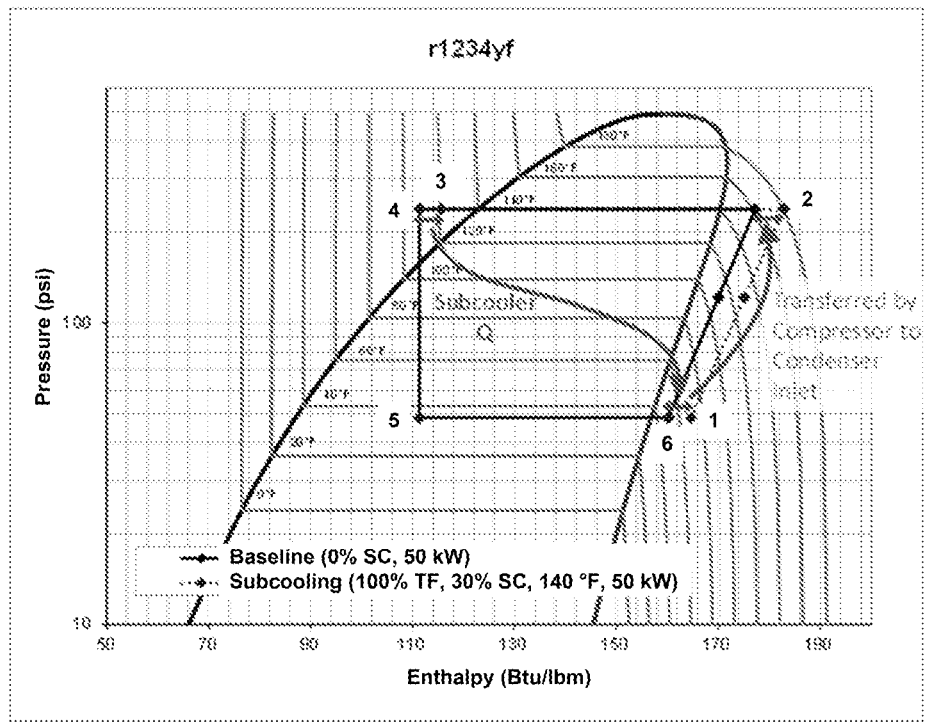
FIG. 4A is an example P-H graph of the vapor cycle system of FIG. 1 at high heat load with and without subcooler flow.
Figure 4B:
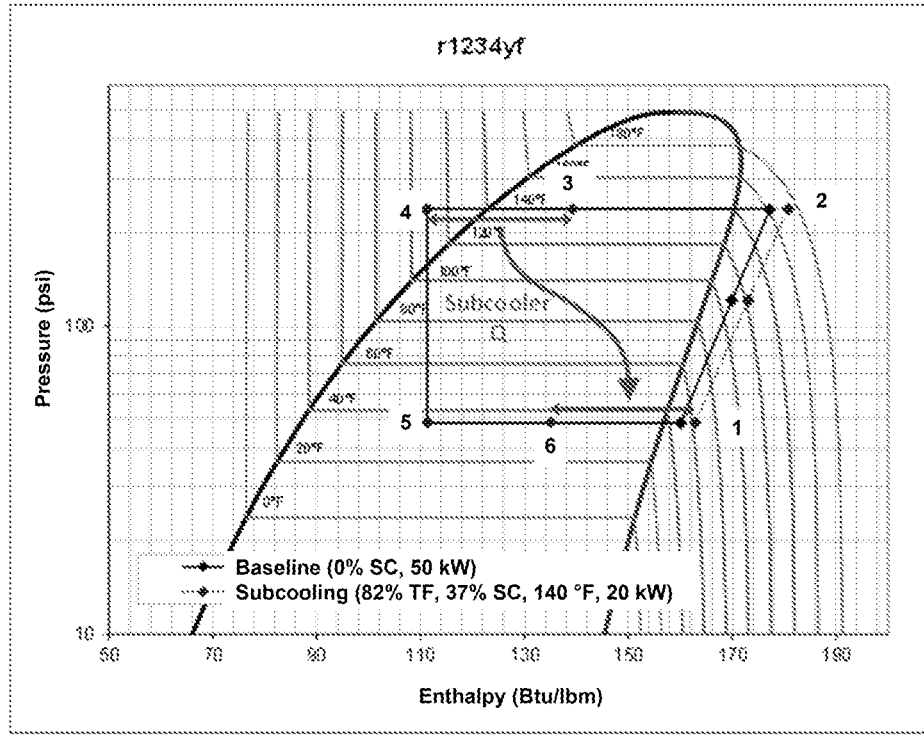
FIG. 4B is an example P-H graph of the vapor cycle system of FIG. 1 at low heat load with subcooler flow.
Figures 4C, 4D:
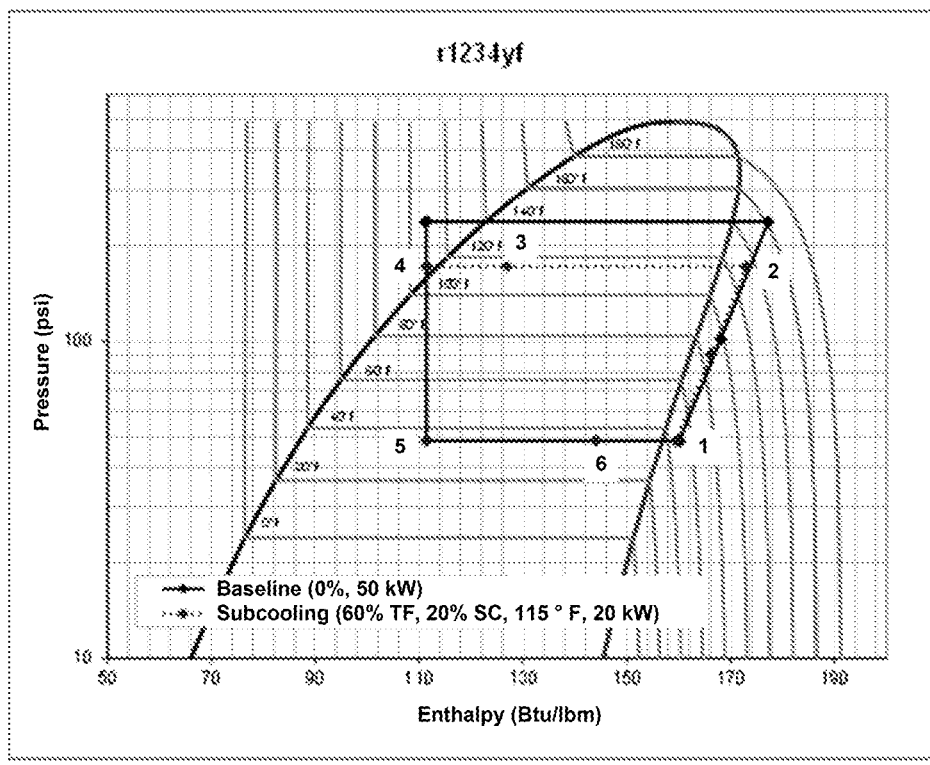
FIG. 4C is an example P-H graph of the vapor cycle system of FIG. 1 at low heat load with subcooler flow and low compressor outlet pressure.
FIG. 4D is an example P-H graph of the vapor cycle system of FIG. 1 at low heat load with subcooler flow and a lower pressure refrigerant.
Figure 4E:
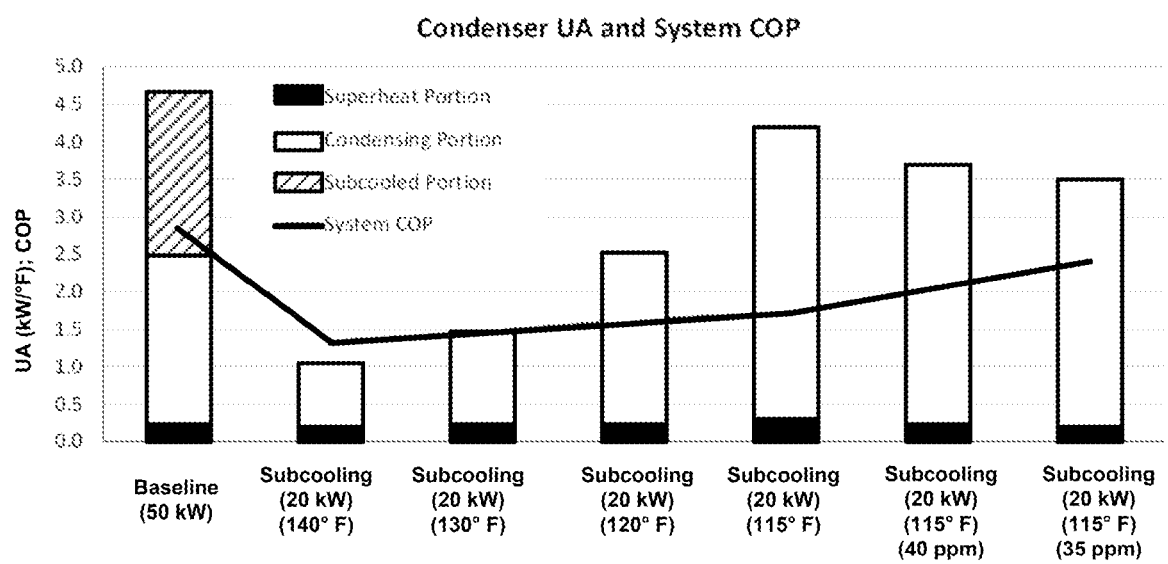
FIG. 4E is an example bar graph of heat load of condenser and COP of centrifugal compressor of the vapor cycle system of FIG. 1 at the various operating conditions

FIGS. 4A-4D are example pressure-enthalpy (P-H) graphs of vapor cycle system 100 of FIG. 1 at various operating conditions, while FIG. 4E is an example bar graph of heat load of condenser 112 and COP of centrifugal compressor 110 at the various operating conditions. FIGS. 4A-4E were generated based on simulations of 50 kW vapor cycle system for vapor cycle system 100. FIGS. 4A-4C are based on a r1234yf baseline system having a 140° F. condensing temperature (corresponding to a 238 psia saturation pressure), 109° F. (10° F. above ram air temperature), and 35° F. evaporating temperature (corresponding to 49 psia saturation pressure).

FIG. 4A is an example P-H graph of the vapor cycle system 100 of FIG. 1 at high heat load with (Example 1) and without (Example 2) subcooler flow. The solid line represents high heat load without flow through subcooler 116, while the dashed line represents high heat load with 30% of the refrigerant flow downstream of evaporator 106 to cool subcooler 116. The effect of subcooler 116 is to increase an inlet temperature (and superheat) of centrifugal compressor 110, resulting in hotter outlet temperature of centrifugal compressor 110. Condenser 112 then rejects the same amount of heat, but does more of it in the superheat region, with subcooler 116 making up the difference in the subcooling region to get to the same inlet temperature and enthalpy of expansion device 118 (State Point 4).

Since ΔH (State Point 6 minus State Point 5) of evaporator 106 is unchanged, the overall refrigerant flow required from centrifugal compressor 110 is unchanged, and the COP is nearly the same as the baseline cycle without flow through subcooler 116. The cycle in FIG. 4A represents a high heat load (e.g., on a hot day). Heat transfer at subcooler 116 is very small, as there is no liquid refrigerant going through a cold side of subcooler 116.

FIG. 4B is an example P-H graph of the vapor cycle system 100 of FIG. 1 at low heat load with subcooler flow. In the example of FIG. 4B, vapor cycle system 100 may operate at a heat load of about 40%. Ideally, a P-H diagram for a vapor cycle system may be similar to a high heat load condition, but with only 40% of the refrigerant flow. However, operability of centrifugal compressor 110 may prevent this, as flow of the refrigerant may only be turned down so much before centrifugal compressor 110 surges. Conversely, if flow is not reduced proportionately, then superheat of refrigerant to centrifugal compressor 110 may be lost, resulting in liquid ingestion in centrifugal compressor 110.

In contrast, FIG. 4B illustrates operation of vapor cycle system 100 at a heat load of 40% (20 kW), but with refrigerant flow of 82%. Because the refrigerant flow remains high, the refrigerant leaves evaporator 106 with a relatively large liquid fraction. This liquid refrigerant may be at a relatively low temperature (e.g., 35° F.), such that subcooler 116 may drive heat transfer to the relatively high temperature condenser 112 (e.g., 140° F.). This heat transfer maintains inlet superheat of centrifugal compressor 110 even though flow is only slightly less (e.g., 82%) than the max design flow.

FIG. 4C is an example P-H graph of the vapor cycle system 100 of FIG. 1 at low heat load with subcooler flow and low compressor outlet pressure. The condensing pressure of condenser 112 is limited by the heat sink temperature of ram air system 114. The ΔT between this heat sink and the gas/liquid refrigerant determines a size of condenser 112. In the baseline cycle, such as described in FIG. 4A, a temperature of ram air from ram air system 114 may only be about 99° F. compared to a condensing temperature of about 140° F. and an outlet temperature of condenser 112 of about 109° F. Lowering the condensing temperature to, for example, 130° F. would reduce the ΔT between condensing refrigerant and the heat sink by about 25%, requiring condenser 112 to be substantially larger.

FIG. 4E is an example bar graph of heat transfer for temperature differential ("UA") and compressor operating pressure ratio for vapor cycle system 100 under various configurations and flow rates. In the subcooling cycle of accumulator 108 and subcooler 116, the presence of subcooler 116 as a large heat sink at 35° F. (the evaporating temperature a cold side refrigerant of subcooler 116) may permit pull down of an outlet pressure of centrifugal compressor 110, as represented by the UA of FIG. 4E.

As shown in FIG. 4E, condenser 112 sized for the 50 kW maximum design condition may have a UA of 4.7 kW/° F.

(for the 400 lb/min of ram air flow from ram air system 114 in this example). In comparison, the UA to transfer the heat in the 20 kW subcooling cycle is only 1.0 kW/° F. The UA of condenser 112 may be fixed by heat exchanger design of condenser 112 and ram flow from ram air system 114, such that the UA at this condition may be about the same (e.g., 4.7 kW/° F.) as the baseline. Since a heat load of condenser 112 may be fixed, the ΔT between hot and cold sides of condenser 112 may be lower. As shown in FIG. 4E, at 120° F. condensing temperature of condenser 112, the superheat and condensing portion of the UA is about the Baseline value, and by 115° F. condensing temperature of condenser 112, the UA is about the Baseline value.

The lower condensing pressure may allow for lower ΔH of centrifugal compressor 110, and thus higher COP for centrifugal compressor 110. By reducing the ΔH of centrifugal compressor 110, vapor cycle system 100 may also have a lower flow for centrifugal compressor 110 before reaching the surge limit, which may further reduce power of centrifugal compressor 110. FIG. 4E illustrates the impact of lowering flow of centrifugal compressor 110 from 48 to 40 and 35 lb/min with the 115° F. condensing pressure of condenser 112. At 35 lb/min, the COP of centrifugal compressor 110 has climbed back up to 2.39, or 84% of the COP at the Baseline maximum heat load condition. The UA of condenser 112 for this condition is lower than the baseline.

FIG. 4D is an example P-H graph of the vapor cycle system 100 of FIG. 1 at low heat load with subcooler flow and a lower pressure refrigerant. As shown in FIG. 4D, for vapor cycle system 100 in a baseline configuration, a change from r1234yf to r1233zd may result in a UA of condenser 115 dropping from 4.7 kW/° F. to 3.8 kW/° F. due to a broader r1233zd dome. The broader dome may lower the UA of condenser 112 by using lower refrigerant flow (e.g., 29% less refrigerant flow) thereby reducing power of centrifugal compressor 110 from 17.5 to 16.0 kW and reducing an overall heat load of condenser 112. Additionally or alternatively, the broader dome may transfers more of a total heat load in the constant-temperature condensing portion of condenser 112, which may substantially reduce the heat transferred in the lower ΔT hot-cold sub-cooling section of subcooler 116.

As shown in FIG. 4D, for vapor cycle system 100 in a recuperative subcooling configuration, a change from r1234yf to r1233zd may reduce the UA of condenser 112 from 3.8 kW/° F. to 3.4 kW/° F. For example, at a 40% part-heat load condition, vapor cycle system 100 may reduce condensing temperature of condenser 112 to ~115° F. and have a COP of centrifugal compressor 110 of ~86% of the COP of centrifugal compressor 110 at the maximum design heat load condition. The COP for vapor cycle system 100 with r1233zd may be higher than the COP for vapor cycle system 100 with r1234yf at 40% heat load condition (2.71 vs. 2.39). As another example, for vapor cycle system 100 in a recuperative subcooling configuration at a 20% heat load condition (10 kW) a change from r1234yf to r1233zd may further reduce a condensing pressure of condenser 112.

To achieve a same 35° F. evaporating temperature and 140° F. condensing temperature, an r1233zd system may operate at a significantly higher compressor pressure ratio (7.6) than the r1234yf (4.9) system. As such, centrifugal compressor 110 may be a 3-stage compressor, rather than a 2-stage compressor. The condensing and evaporating temperatures may be design parameters that may be moved with design of vapor cycle system and sizing of condenser 112 and subcooler 116. For example, the UA of condenser 112, the COP of centrifugal compressor 110, and the Pressure Ratio of centrifugal compressor 110 may be varied by changing the condensing temperature of condenser 112 and the flow ratio of subcooler 116 (assuming a 99° F. ram temperature and maintaining 25° F. compressor superheat). By lowering the condensing temperature of condenser 112 to 135° F., the pressure ratio of centrifugal compressor 110 may be reduced to 7:1 with condenser 112 smaller than the r1234yf baseline (UA of 4.33 kW/° F. vs. 4.68 kW/° F.) Lowering condensing temperature of condenser 112 to 130° F. decreases the pressure ratio of centrifugal compressor 110 to 6.5:1, which may be in the range of a 2-stage centrifugal compressor.

In some examples, increasing a flow ratio to subcooler 116 may increase power of centrifugal compressor 110 but decrease the UA of condenser 112. For example, at 130° F. condensing temperature of condenser 112 and 30% subcooler flow ratio to subcooler 116, the UA of condenser 112 and COP of centrifugal compressor 110 is 5.29 kW/° F. and 3.20 vs. 4.68 kW/° F. and 2.85 for vapor cycle system 110 having r1234yf.

An increase in the UA of condenser 112 may increase a size or weight of condenser 112. However, vapor cycle system 100, including condenser 112, may be designed for a maximum normal pressure of ~100 psig, rather than 300 psig. At burst multiples of 3.0, this reduced pressure may represent a dramatic reduction from 1200 psig to 300 psig, which may translate into lower equipment weight.

Example 1: A system includes an evaporator configured to cool a pressurized air stream using a refrigerant; an accumulator downstream of the evaporator and configured to store excess refrigerant; a centrifugal compressor downstream of the accumulator and configured to compress the refrigerant; a first heat exchanger stage downstream of the centrifugal compressor and configured to cool the refrigerant using environmental air; and a second heat exchanger stage downstream of the centrifugal compressor and configured to cool the refrigerant from the first heat exchanger stage using a portion of the excess refrigerant from the accumulator.

Example 2: The system of example 1, wherein the portion of the excess refrigerant from the accumulator is gravity-fed to the second heat exchanger stage.

Example 3: The system of example 1 or 2, wherein the accumulator includes a liquid separator configured to separate liquid refrigerant from the refrigerant received from the evaporator and store the separated liquid refrigerant as the excess refrigerant.

Example 4: The system of any of examples 1 to 3, wherein the first heat exchanger stage comprises a condenser, and wherein the second heat exchanger stage comprises a subcooler.

Example 5: The system of any of examples 1 to 4, wherein the first and second heat exchanger stages are integrated into a same unit.

Example 6: The system of any of examples 1 to 5, wherein the pressurized air stream is a cabin air stream for a cabin of an aircraft, and wherein the first heat exchanger stage is configured to receive the environmental air from a ram air system of the aircraft.

Example 7: The system of any of examples 1 to 6, further comprising an isolation valve configured to isolate flow of the excess refrigerant to the second heat exchanger stage from the accumulator.

Example 8: The system of any of examples 1 to 7, wherein the system does not include an active surge control system configured to recirculate refrigerant from an outlet of the centrifugal compressor to an inlet of the centrifugal compressor.

Example 9: The system of any of examples 1 to 8, wherein the system is configured to maintain a substantially similar mass flow rate of the refrigerant through the evaporator and the centrifugal compressor.

Example 10: A subcooling system for controlling surge in a vapor cycle system includes an accumulator configured to: receive a refrigerant from an evaporator, wherein the refrigerant comprises a vapor fraction of the refrigerant and a liquid fraction of the refrigerant; separate the liquid fraction of the refrigerant from the vapor fraction of the refrigerant; and discharge the vapor fraction of the refrigerant to a centrifugal compressor; and a subcooler configured to: receive the liquid fraction of the refrigerant from the accumulator; evaporate at least a portion of the liquid fraction of the refrigerant by cooling refrigerant from a condenser; and discharge the evaporated refrigerant to the centrifugal compressor.

Example 11: The subcooling system of example 10, further comprising the condenser upstream of the subcooler, wherein the condenser is configured to cool vapor refrigerant from the centrifugal compressor using environmental air.

Example 12: The subcooling system of example 11, wherein the subcooler and the condenser are integrated into a same unit.

Example 13: A method for cooling a pressurized air stream includes cooling, by a main circuit of a vapor cycle system, the pressurized air stream using a refrigerant, wherein the vapor cycle system comprises an evaporator, a centrifugal compressor, a condenser, and an expansion device; and diverting, by a subcooling circuit of the vapor cycle system, a liquid fraction of the refrigerant from the evaporator through a subcooler downstream of the condenser to evaporate the liquid fraction of the refrigerant.

Example 14: The method of example 13, wherein the subcooling circuit comprises an accumulator and the subcooler, and wherein the method further comprises: receiving, by the accumulator, the refrigerant from the evaporator cooling the pressurized air stream; and discharging, by the accumulator, a vapor fraction of the refrigerant from the evaporator to the centrifugal compressor and the liquid fraction of the refrigerant to the subcooler.

Example 15: The method of example 14, further includes providing, by the condenser, a first stage of heat transfer to vapor refrigerant from the centrifugal compressor; and providing, by the subcooler, a second stage of heat transfer to the refrigerant from the condenser.

Example 16: The method of any of examples 13 to 15, wherein cooling, by the main circuit, the pressurized air stream further comprises: evaporating, by the evaporator, at least a portion of the refrigerant by removing heat from the pressurized air stream; compressing, by the centrifugal compressor, the refrigerant from the evaporator; cooling, by the condenser, the refrigerant using environmental air; reducing, by the expansion device, a pressure of the refrigerant.

Example 17: The method of any of examples 13 to 16, further comprising separating, by the subcooling circuit, the liquid fraction of the refrigerant from a vapor fraction of the refrigerant from the evaporator.

Example 18: The method of any of examples 13 to 17, wherein a mass flow rate of refrigerant through the evaporator is substantially similar to a mass flow rate of refrigerant through the centrifugal compressor.

Various examples have been described. These and other examples are within the scope of the following claims.

What is claimed is:

1. A system, comprising:
    an evaporator configured to cool a pressurized air stream using a refrigerant;
    an accumulator downstream of the evaporator and configured to store excess refrigerant;
    a centrifugal compressor downstream of the accumulator and configured to compress the refrigerant;
    a first heat exchanger stage downstream of the centrifugal compressor and configured to cool the refrigerant using environmental air; and
    a second heat exchanger stage downstream of the first heat exchanger stage, wherein the second heat exchanger stage is configured to:
        receive the refrigerant directly from the first heat exchanger stage; and
        cool the refrigerant from the first heat exchanger stage using a portion of the excess refrigerant from the accumulator.

2. The system of claim 1, wherein the portion of the excess refrigerant from the accumulator is gravity-fed to the second heat exchanger stage.

3. The system of claim 1, wherein the accumulator includes a liquid separator configured to separate liquid refrigerant from the refrigerant received from the evaporator and store the separated liquid refrigerant as the excess refrigerant.

4. The system of claim 1,
    wherein the first heat exchanger stage comprises a condenser, and
    wherein the second heat exchanger stage comprises a subcooler.

5. The system of claim 1, wherein the first and second heat exchanger stages are integrated into a same unit.

6. The system of claim 1,
    wherein the pressurized air stream is a cabin air stream for a cabin of an aircraft, and
    wherein the first heat exchanger stage is configured to receive the environmental air from a ram air system of the aircraft.

7. The system of claim 1, further comprising an isolation valve configured to isolate flow of the excess refrigerant to the second heat exchanger stage from the accumulator.

8. The system of claim 1, wherein the system does not include an active surge control system configured to recirculate refrigerant from an outlet of the centrifugal compressor to an inlet of the centrifugal compressor.

9. The system of claim 1, wherein the system is configured to maintain a similar mass flow rate of the refrigerant through the evaporator and the centrifugal compressor.

10. The system of claim 1, further comprising a computing device configured to control operation of the centrifugal compressor, an expansion device upstream of the evaporator, and a ram air system supplying the environmental air to the first heat exchanger.

11. A subcooling system for controlling surge in a vapor cycle system, comprising:
    an accumulator configured to:
        receive a refrigerant from an evaporator, wherein the refrigerant comprises a vapor fraction of the refrigerant and a liquid fraction of the refrigerant;
        separate the liquid fraction of the refrigerant from the vapor fraction of the refrigerant; and
        discharge the vapor fraction of the refrigerant to a centrifugal compressor;
    a condenser configured to receive the refrigerant from the centrifugal compressor; and a subcooler configured to:
  receive the liquid fraction of the refrigerant from the accumulator;
  receive the refrigerant directly from the condenser;
  evaporate at least a portion of the liquid fraction of the refrigerant from the accumulator by cooling the refrigerant from the condenser; and
  discharge the evaporated refrigerant to the centrifugal compressor.

12. The subcooling system of claim 11, wherein the condenser is configured to cool vapor refrigerant from the centrifugal compressor using environmental air.

13. The subcooling system of claim 12, wherein the subcooler and the condenser are integrated into a same unit.

14. The subcooling system of claim 11, further comprising an isolation valve configured to isolate flow of the liquid fraction of the refrigerant to the subcooler from the accumulator.

15. The system of claim 1, wherein the second heat exchanger stage is configured to receive all of the refrigerant from the first heat exchanger stage.

16. The system of claim 1, wherein the evaporator is configured to receive all of the refrigerant pumped by the centrifugal compressor.

17. The system of claim 10, wherein the computing device is configured to control the operation such that, at low heat loads, the first heat exchanger stage is configured to receive the refrigerant having a vapor phase and a liquid phase.

18. A method for cooling a pressurized air stream, comprising:
  cooling, by a main circuit of a vapor cycle system, the pressurized air stream using a refrigerant, wherein the vapor cycle system comprises an evaporator, a centrifugal compressor, a condenser, and an expansion device; and
  diverting, by a subcooling circuit of the vapor cycle system, a liquid fraction of the refrigerant from the evaporator through a subcooler downstream of the condenser to evaporate the liquid fraction of the refrigerant, wherein diverting the liquid fraction comprises:
    receiving, by an accumulator of the subcooling circuit, the refrigerant from the evaporator cooling the pressurized air stream;
    separating, by the accumulator, the liquid fraction of the refrigerant from a vapor fraction of the refrigerant from the evaporator, and
    discharging, by the accumulator, the vapor fraction of the refrigerant from the evaporator to the centrifugal compressor and the liquid fraction of the refrigerant to the subcooler of the subcooling circuit;
    receiving, by the subcooler, the liquid fraction of the refrigerant from the accumulator;
    receiving, by the subcooler, the refrigerant from the condenser;
    evaporating, by the subcooler, at least a portion of the liquid fraction of the refrigerant from the accumulator by cooling the refrigerant from the condenser; and
    discharging, by the subcooler, the evaporated refrigerant to the centrifugal compressor.

19. The method of claim 18, further comprising:
  providing, by the condenser, a first stage of heat transfer to vapor refrigerant from the centrifugal compressor; and
  providing, by the subcooler, a second stage of heat transfer to the refrigerant from the condenser.

20. The method of claim 18, wherein a mass flow rate of refrigerant through the evaporator is similar to a mass flow rate of refrigerant through the centrifugal compressor.

* * * * *